United States Patent
Lail, Jr. et al.

(10) Patent No.: US 7,209,769 B2
(45) Date of Patent: Apr. 24, 2007

(54) AUTOMATED USER INTERFACE FEATURE FOR A PORTABLE COMMUNICATION DEVICE

(75) Inventors: Charles S. Lail, Jr., Plantation, FL (US); Neil T. Kennedy, Miramar, FL (US); John F. Murray, Miami Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 644 days.

(21) Appl. No.: 10/648,944

(22) Filed: Aug. 26, 2003

(65) Prior Publication Data
US 2005/0049003 A1 Mar. 3, 2005

(51) Int. Cl.
*H04B 1/38* (2006.01)
(52) U.S. Cl. .................. 455/557; 455/556.1; 455/550.1
(58) Field of Classification Search ............... 455/74.1, 455/569.1, 574, 550.1, 557, 556.1
See application file for complete search history.

(56) References Cited

U.S. PATENT DOCUMENTS

| | | | |
|---|---|---|---|
| 5,077,832 A * | 12/1991 | Szczutkowski et al. ..... 455/566 |
| 5,499,014 A * | 3/1996 | Greenwaldt ............ 340/539.11 |
| 5,987,311 A | 11/1999 | Phillips |
| 6,144,864 A * | 11/2000 | Lands et al. ............. 455/569.1 |
| 6,445,936 B1 * | 9/2002 | Cannon et al. ............. 455/573 |
| 2003/0017848 A1 | 1/2003 | Engstrom et al. |
| 2004/0203499 A1 * | 10/2004 | Kostianinen et al. ...... 455/90.3 |

* cited by examiner

*Primary Examiner*—Sanh Phu
(74) *Attorney, Agent, or Firm*—Barbara R. Doutre

(57) ABSTRACT

An automatic keypad lockout system automatically disables the keypad or other buttons of a personal electronic device (102, 202, 302, 402) when it is stored in an accessory (104, 204, 304, 404) and then automatically re-enables the keypad upon removal of the device from the accessory without effort by the user. Encoding and decoding is accomplished through a variety of devices including magnetic (100), electrical (200), optical (300, 400), and mechanical (500) implementations. The automatic keypad lockout system is extendable (600), (700), (800), and (900) to provide a unique identity (ID), to interchangeable accessories (604, 704, 804, 804). The unique ID is associated with a predetermined user configuration with which to configure the communication device (602, 702, 802, and 902).

1 Claim, 3 Drawing Sheets

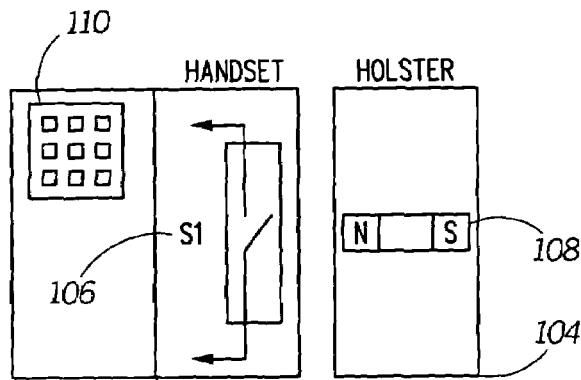

AUTOMATED USER INTERFACE FEATURE FOR A PORTABLE COMMUNICATION DEVICE

TECHNICAL FIELD

This invention relates in general to portable communications devices and more particularly to automated user interface features associated with such devices.

BACKGROUND

Personal communication devices, such as cellular telephones, personal digital assistants (PDAs), pagers and two-way radios are often carried in an accessory, such as a body worn holster, for portability. Many of these devices have exposed keypads. In general, personal communication devices in their holsters are susceptible to key presses resulting in undesired operation. Such undesired operation can result in unwanted calls being placed, the device being inadvertently powered down, personal memory being removed, and other problems. Personal memory being removed results in the loss of personalized settings.

Phones with exposed keypads may allow the user to lock the keypad, but doing so typically requires multiple keystrokes to engage the lock and unlock feature. Given the usual number of keystrokes needed to perform this task, many users ignore or forget the lockout feature altogether. Furthermore, current technology provides no convenient or robust means for replacing the device's personalized settings once lost.

Reprogramming personal settings on a communication device can be impractical. Users are often forced to manually re-enter their personalized settings, which is very time consuming, or have the settings downloaded via a computer. The reprogramming of personal settings is not just an issue when the settings have been lost but also when multiple users want to share the same device. Swapping personalized settings, such as address book, preferred ring tone, speed dial numbers, etc., can be very cumbersome requiring inconvenient reprogramming of the settings as mentioned above.

Accordingly, there is a need to protect personalized settings in a communication device. A means of preventing loss of the personalized settings and facilitating the exchange of personalized settings amongst multiple users would be highly beneficial.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

FIG. 1 is a block diagram of an automatic keypad lockout system in accordance with a first embodiment of the invention;

FIG. 2 is a block diagram of an automatic keypad lockout system in accordance with a second embodiment of the invention;

FIG. 3 is a block diagram of an automatic keypad lockout system in accordance with a third embodiment of the invention;

FIG. 4 is a block diagram of an automatic keypad lockout system in accordance with a fourth embodiment of the invention;

DETAILED DESCRIPTION OF THE PREFERRED EMBODIMENT

Figure 5:
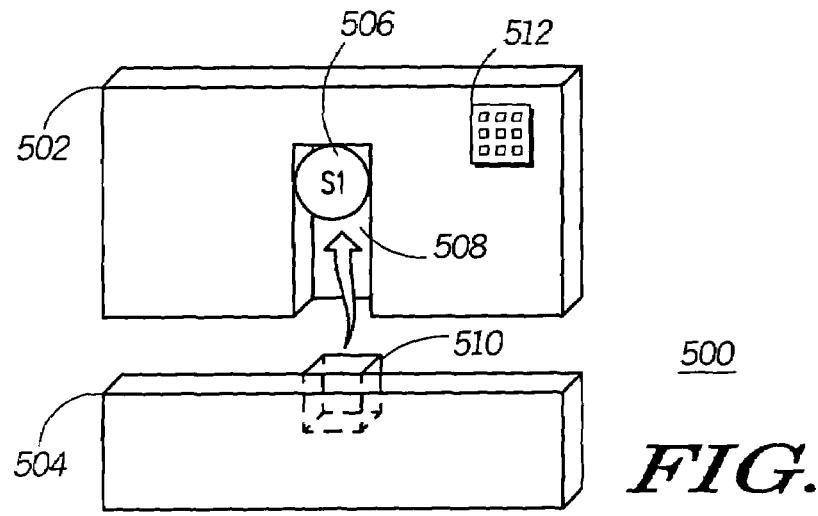
FIG. 5 is a block diagram of an automatic keypad lockout system in accordance with a fifth embodiment of the invention.

While the specification concludes with claims defining the features of the invention that are regarded as novel, it is believed that the invention will be better understood from a consideration of the following description in conjunction with the drawing figures, in which like reference numerals are carried forward.

In accordance with the present invention, there will be described herein a means for automatically disabling the keypad or other buttons of a cellular telephone, portable radio, or other personal electronic device when it is stored in its accessory and then automatically re-enabling the keypad upon removal of the device from accessory. Thus, the unintentional activation of features, for example, a seatbelt buckle depressing a button on a cell phone, is prevented with no effort on the part of the user. The keypad is preferably disabled by providing the device with a single bit of information, which encodes whether or not the device is coupled to an accessory. The encoding is accomplished through magnetic, mechanical, electrical, or optical means, the details of which are discussed in various embodiments.

There will also be described herein a means for assigning a unique identity, such as a serial number, to the individual accessory, be it holster, cover, belt clip, or other accessory. The number is embedded in the accessory by expanding the techniques used to implement the keypad disable functionality. In this case, the device is preferably provided with multiple bits, the pattern of which represents a unique serial number. The communication device reads the identification number from the accessory and assumes a particular configuration of options associated with that number. The feature set of the device can thus be customized for a specific user simply by mating it with a particular accessory.

The means for detecting insertion and removal of a portable communication device into an accessory will be discussed in terms of four embodiments: magnetic, electrical, optical, and mechanical implementations. Referring now to FIG. 1 there is shown a block diagram of an automatic keypad lockout system 100 in accordance with a first embodiment of the invention. System 100 includes a portable electronic device 102 and an accessory, designated here as a holster, 104 for receiving the device. Portable electronic device includes a keypad 110. The magnetic implementation of the keypad lockout feature 100 utilizes a magnetic reed switch 106 and a corresponding magnet 108 to open the switch. Switch 102 is embedded in the portable electronic device on a side of the device which mates with the accessory. The magnet 108 is embedded within the accessory 104, positioned to align with the reed switch 106 when the device 102 is completely inserted into the accessory 104. As long as the device 102 is outside of the accessory 104, the reed switch 106 remains closed, which causes the keypad 110 to be enabled. When the device 102 is inserted into the accessory 104, the magnetic field from the accessory magnet opens the switch 106. The device 102 detects the open switch 106 and disables the keypad 110.

The handset and accessory are preferably made of materials that allow the magnetic field to permeate the housing of the device and accessory, thereby neither the reed switch 106 nor the corresponding magnet 108 need to be exposed. They may instead be concealed within the housing so that they are not visible to the user.

FIG. 2 is a block diagram of an automatic keypad lockout system 200 in accordance with a second embodiment, the electrical implementation, of the invention. System 200 includes a portable electronic device 202 and an accessory 204 for receiving the device. The electrical implementation of system 200 utilizes contacts 206 on the surface of the device on a side which comes into contact with the device's accessory 204. The accessory 204 includes corresponding contacts 208, which will electrically short-circuit the two contacts on the device 202 when the device is coupled to the accessory. The device 202 detects, preferably via a controller 216, whether the two contacts 206 are shorted by the accessory 208. For example, one contact may be pulled to a reference voltage, Vref 210, internal to the device 202 through a resistor 212, and the other contact pulled directly to ground 214. Thus, when the device is coupled to the accessory 204, the first contact will transition from Vref to ground, which will be detected by the controller 216 and disable the keypad 220. When the device 202 is removed from the accessory 204, the first contact will transition back to Vref to enable the keypad 220. The electrical contacts 206, 208 do not need to conduct much current and can therefore be small—only large enough to ensure proper alignment with the mating contacts. Device contacts 206 and corresponding contacts 208 are preferably integral to the design.

While the system 200 is shown with one device contact 206 pulled to a reference voltage when open-circuited and coupled to ground when short-circuited, other electrical configurations can be used. For example, the opposite configuration can be used in which at least one device contact 206 is pulled to ground when open-circuited (device removed from accessory) and coupled to the reference voltage 210 when short-circuited (device attached to accessory). While these are the two simplest electrical configurations other configurations could be used as well.

FIG. 3 is a block diagram of an automatic keypad lockout system 300 in accordance with a third embodiment, optical implementation, of the invention. System 300 includes a portable electronic device 302 and an accessory 304 for receiving the device. The optical implementation utilizes an infrared light-emitting diode (IR LED) 306 and IR phototransistor 308 in the device 302 to detect the presence of the accessory 304. In the preferred implementation of this third embodiment, the device 302 includes a small slot 310 molded therein. The IR LED 306 and phototransistor 308 are mounted on opposite sides of the slot 310, facing each other. The device 302 turns the photodiode 306 on periodically (via a controller not shown) for a very brief duration (such as 1 ms every 300 ms) and monitors the phototransistor 308 to determine if the IR LED 306 is detected. When the device 302 is out of the accessory 304, the periodic pulse of the LED 306 is detected by the phototransistor 308 thereby enabling the keypad 316. When the device 302 is inserted into the accessory 304, a small tab 312 on the accessory 304 inserts into the slot 310 on the device. Tab 312 blocks the path of the light between the LED 306 and phototransistor 308, allowing the device 302 to detect the presence of the accessory 302 due to the absence of a received light pulse at the phototransistor 308. The detection of the accessory in turn disables the keypad 316.

In an alternative optical implementation shown in FIG. 4, like reference numerals are carried over from FIG. 3. In system 400, both the LED 306 and phototransistor 308 are mounted at the surface of the device 302, behind an IR-transparent plastic lens 418 on a side of the device which will be in contact with the accessory. In accordance with this fourth embodiment, when the device 302 is inserted into its accessory 304, the pulses of light from the LED 306 will be reflected from an IR-reflective surface 420 on the accessory 304 and detected by the phototransistor 308 to disable the keypad 316. When the device 302 is removed from accessory 304, the pulses of light from the LED 306 will no longer be reflected from the accessory 304 and no longer be detected by the phototransistor 308 thereby enabling the keypad 316. The LED 306 operates at a low intensity to save power and reduce undesirable reflections, such as off of the hand of the device's user. The IR-reflective surface 420 is preferably polished to improve reflection, and thereby reduce the intensity at which the LED operates (which, in turn, reduces the chance of false reflections).

FIG. 5 is a block diagram of an automatic keypad lockout system 500 in accordance with a fifth embodiment, a mechanical implementation, of the invention. System 500 includes a portable electronic device 502 and an accessory 504 for receiving the device. The mechanical implementation of the keypad lockout system 500 utilizes a mechanically-actuated switch 506 on the device 502. The switch 506 is positioned on the outside surface of the device 502 such that it is activated or engaged when the device is inserted into its accessory 504. The device 502 detects activation of the switch 506 and disables the keypad 512 until the device is removed from the accessory 504 and the switch is released or disengaged thereby enabling the keypad. The switch 506 may be any appropriate mechanical switch, and may be designed to be visually integrated within the device 502 so as not to be readily detectable to the user and not detract from the appearance of the device 502. For example, a button may be covered with a flexible plastic membrane which matches the device's housing. Alternatively, the switch 506 can be recessed into a small slot 508 in one end of the device, and a protruding tab 510 on the accessory 504 closes or opens the switch when the device 502 is inserted into the accessory 504.

Moving now to the implementation of the multiple user capability provided as an extension of the keypad lockout feature. The following embodiments (sixth through ninth) are extensions to those already described. In accordance with these embodiments, rather than using a single bit of information which represents the presence of the accessory, multiple bits are now used to encode user IDs or serial numbers which are associated with particular interchangeable accessories, such as holsters, covers, belt clips or others. The ID numbers are stored in the accessories using one of several techniques to be discussed. When the portable electronic device is mated with a particular accessory containing an ID, the device reads the ID from the accessory and assumes a predetermined configuration associated with that ID. The new configuration persists until the device is mated with another accessory containing a different ID.

The manner in which the electronic communication device alters its configuration based on the ID depends on the nature of the device and the design of the device's software and feature set. The device can maintain a set of preferences for each of a number of distinct users, with each set associated with a different ID. For instance, the owner of the device can configure the device so that its capabilities are limited when mated with any accessory other than its own. As another example, a cell phone can maintain a different incoming/outgoing call history for each ID. The potential applications for such an embedded ID are immense. Four general embodiments for encoding the ID, each with at least one specific implementation, are discussed with reference to FIGS. 6–9.

Figure 6:
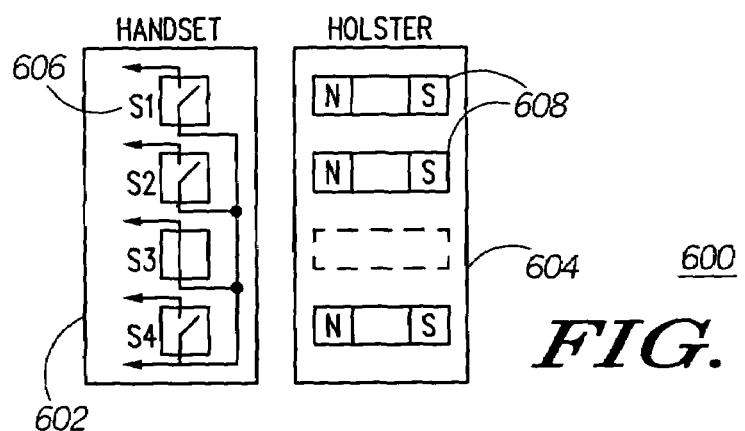
FIG. 6 is a block diagram of an automatic multi-user personalization implementation of the keypad lockout system in accordance with a sixth embodiment of the invention.

FIG. 6 is a block diagram of an automatic multi-user personalization implementation 600 of the keypad lockout system in accordance with a magnetic implementation of the invention. System 600 includes a portable electronic device 602 and an accessory 604 for receiving the device. The magnetic implementation of the multiple user features uses the same embedded reed switches as the automatic keypad lockout of FIG. 1, except that to store multiple bits, multiple reed switches 606 are embedded in the device 602. The plurality of switches 606 are embedded in the device 602 in a predefined pattern, for example a grid or a line, with one switch for each bit in the ID. The accessory 604 with which the ID number is to be associated has a corresponding array of embedded magnets 606 which align with the reed switches 608 when mated with the electronic device 602. Magnets are placed in or omitted from the accessory to alter the bit pattern. A placed magnet might correspond to a binary '1' and an omitted magnet to a binary '0', though the opposite assignment may be used. At least one magnet must be placed in the accessory 604 since the absence of all magnets will be interpreted by the device 602 as "accessory not present". The number of bits (switch/magnet pairs) can be determined by product designers. As an example, a grid four switches wide by four switches tall would provide 65535 unique ID numbers, and would fit inside an area of approximately one square inch or less. The accessories can each be given their unique ID numbers during manufacturing, or a service depot can place the magnets at the time the accessory is purchased by the user. Since the magnetic field permeates the device's housing, the switches and magnets may be completely concealed within the device, making this an aesthetically-appealing implementation.

Figure 7:
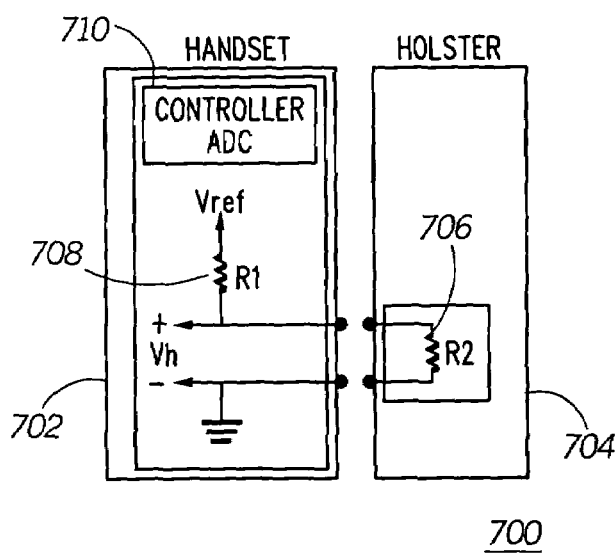
FIG. 7 is a block diagram of an automatic multi-user personalization implementation of the keypad lockout system in accordance with a seventh embodiment of the invention.

FIG. 7 is a block diagram of an automatic multi-user personalization implementation 700, of the keypad lockout system in accordance with an electrical implementation of the invention. System 700 includes a portable electronic device 702 and an accessory 704 for receiving the device. In this electrical implementation 700, a resistor 706 embedded in the accessory 704 completes a simple voltage divider with another resistor 708 in the device 702. The value of the resistor 706 in the accessory 704 determines the voltage in the middle of the voltage divider, which is read by an analog-to-digital converter (ADC) input 710 of the device's microprocessor or a separate analog-to-digital converter IC.

Assuming, for example, that the ADC 710 supports 8-bit conversion, values of the embedded resistor can be chosen to create 256 different voltage levels from the divider, and thus 255 different ID numbers (with one level reserved for the "not present" condition). Two or more such divider circuits can be incorporated into the device 702 and accessory 704 for even more combinations; for example, two such embedded dividers could encode 65535 ID numbers. The first voltage divider would require two electrical contacts on the device and two corresponding contacts on the accessory, since half of the divider is contained in the device. Since additional dividers can share the ground (or Vref, depending on the implementation) terminal with the first, each additional divider would require only one additional contact on the device and on the accessory. The preferred implementation for this embodiment utilizes the resistor 708 contained in the device 702 as the voltage divider's pull-up resistor and the resistor 710 in the accessory 704 as the pull-down. This approach avoids having an exposed electrical contact tied directly to the reference voltage (Vref). One advantage to this electrical implementation of the multiple user features is that it uses very few components.

Figure 8:
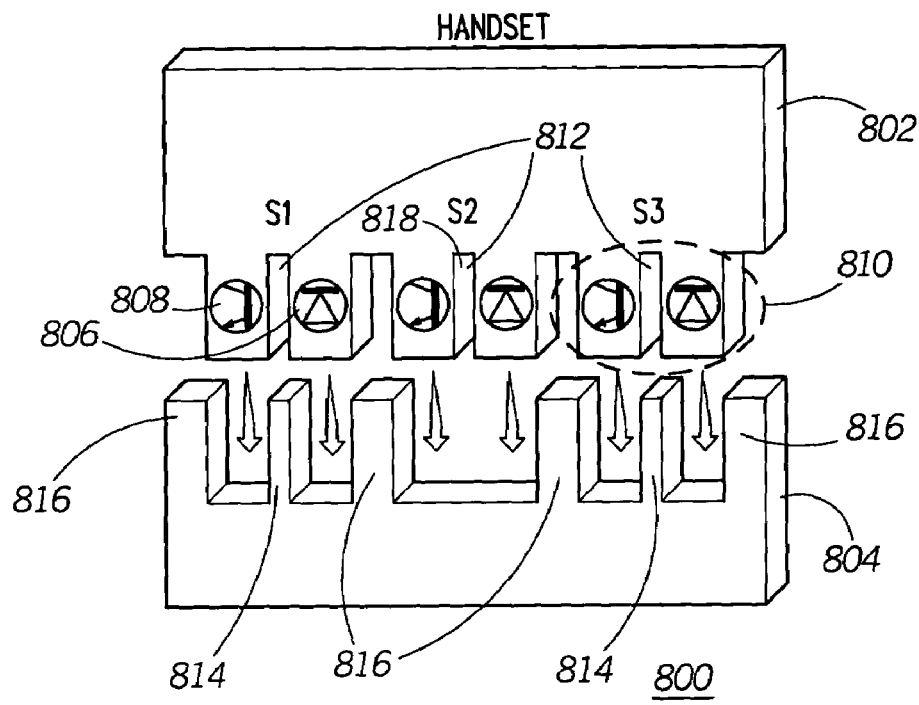
FIG. 8 is a block diagram of an automatic multi-user personalization implementation of the keypad lockout system in accordance with a eighth embodiment of the invention.

FIG. 8 is a block diagram of an automatic multi-user personalization implementation 800, of the keypad lockout system in accordance with an optical implementation of the invention. System 800 includes a portable electronic device 802 and an accessory 804 for receiving the device. The optical implementation involves replicating the optical switch circuit used for the keypad lockout feature described in FIG. 3. Multiple infrared LED 806/phototransistor 808 pairs 810 are embedded in the device 802 between recessed slots 812 (S1, S2, S3) on a surface of the device 802 which mates with the accessory 804. The accessory 804 has integral removable tabs 814 which insert into the slots 812 to selectively block the path of the light. Retention posts 816 can be used to couple the accessory 804 to the handset 802. In accordance with this embodiment of the invention, tabs 814 are placed or omitted to block or allow the transmission of light across slots 812 within each pair of LED/transistor pairs 810, thereby encoding different ID numbers. In this example, tabs 814 will be inserted into slots S1 and S3, but no tab will be inserted into slot S2, 818. As with the keypad lockout implementation, the most energy-efficient method for reading the ID is to pulse the LEDs periodically and monitor the phototransistors for corresponding pulses. If no pulse is received by a particular phototransistor, the tab for that LED/transistor pair is present, so that bit is to be interpreted as a '0' (or '1', depending on the implementation chosen). A received pulse will represent the opposite bit. At least one tab must be placed on the accessory, since the absence of all tabs will appear to the device as though the accessory is not attached.

Figure 9:
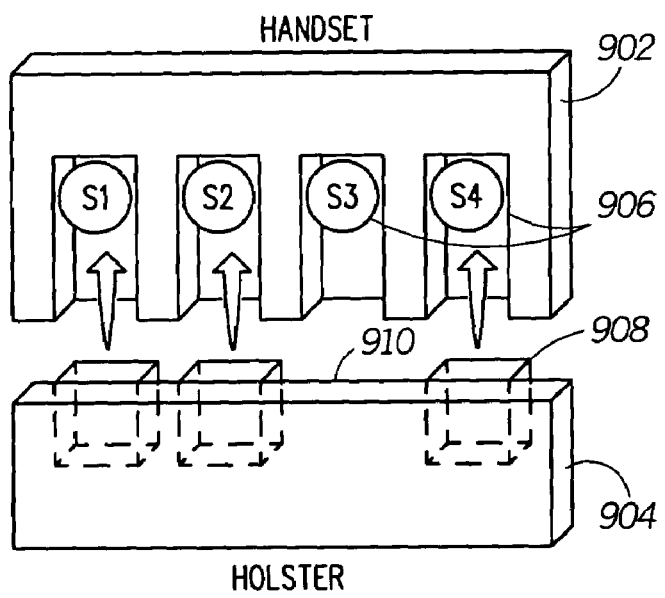
FIG. 9 is a block diagram of an automatic multi-user personalization implementation of the keypad lockout system in accordance with a ninth embodiment of the invention.

FIG. 9 is a block diagram of an automatic multi-user personalization implementation 700, of the keypad lockout system in accordance with a mechanical implementation of the invention. System 900 includes a portable electronic device 902 and an accessory 904 for receiving the device. The mechanical implementation 900 of the multiple user features again represents the bits of the ID number by combining the switches used for the keypad lockout feature of FIG. 5 into an array. As before, the switches 906 are placed on the outer surface of the device 902 such that they are activated when the device is mated with a particular accessory. An array of protrusions 908 and/or recesses 910 are arranged on the accessory 904 in a pattern corresponding to that of the switches 906. When the device 902 is mated with the accessory 904, a protrusion which is present (or similarly, a location at which there is no recess) will actuate the corresponding switch on the device, while locations without a protrusion (or with a recess) will have no effect on the switches 906. Thus, the pattern of protrusions or recesses encodes a particular ID number based on which switches it actuates. The ID numbers may be assigned and embedded into the accessory during manufacturing, or they may be assigned and embedded by a service depot by placing or removing plugs or small posts which serve to actuate the switches on the device.

The embodiments described above can be further extended, if desired, to have alterable ID identifiers in accordance with a further embodiment of the invention. For example, removable tabs, removable protrusions, removable/replaceable magnets, variable resistors (e.g. potentiometer) can all be used to allow the end user (or a service center) to provide an alterable ID. The communication device reads the alterable ID and assumes predetermined personal settings associated with the present configuration of the alterable ID.

Accordingly, there has been provided a feature which automatically locks and unlocks the keypad (or buttons) of a portable electronic communications device as well as extending this feature to support multiple user configurations. The keypad lockout feature of the present invention allows a portable electronic device to detect the presence or absence of its accessory. Linking a phone's features with an interchangeable accessory provides a convenient way to share a phone or other device between multiple users.

The automatic keypad lockout and automatic multiple user support scheme of the present invention are applicable to numerous electronic devices, including cellular telephones, personal digital assistants (PDAs), pagers, and two-way radios. In particular, the automatic keypad lockout concept is useful for devices with a holster, sheath, belt clip, or other body-worn accessory from which the device must be removed before use. The concept for multiple user support is also relevant to any device with an easily-interchangeable accessory, such as holster, cosmetic cover, or sheath. The personalized setting for unique users can be linked to different accessories that can be conveniently exchanged when the device changes hands.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An automatic keypad lockout system, comprising:
a portable communication device having a keypad;
an accessory for receiving the portable communication device;
a means for detecting insertion and removal of the portable communication device into and out of the accessory so as to enable and disable the keypad;
a unique ID stored in the accessory, the unique ID associated with a predetermined user configuration, the portable communication device reading the unique ID from the accessory and assuming the predetermined configuration associated with that ID;
a plurality of reed switches embedded in the device; and
an array of magnets embedded in the accessory for aligning and mating with at least one of the plurality of reed switches forming a predefined pattern corresponding to the unique ID.

* * * * *